(12) United States Patent
Suga et al.

(10) Patent No.: US 11,037,731 B2
(45) Date of Patent: Jun. 15, 2021

(54) MULTI-LAYER CERAMIC ELECTRONIC COMPONENT AND MOUNTING BOARD

(71) Applicant: TAIYO YUDEN CO., LTD., Tokyo (JP)

(72) Inventors: Yasutomo Suga, Tokyo (JP); Shota Yajima, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 31 days.

(21) Appl. No.: 16/688,684

(22) Filed: Nov. 19, 2019

(65) Prior Publication Data

US 2020/0168398 A1 May 28, 2020

(30) Foreign Application Priority Data

Nov. 27, 2018 (JP) .............................. JP2018-220900

(51) Int. Cl.
  *H01G 4/30* (2006.01)
  *H01G 4/232* (2006.01)
  *H01G 4/224* (2006.01)

(52) U.S. Cl.
  CPC .............. *H01G 4/232* (2013.01); *H01G 4/224* (2013.01); *H01G 4/30* (2013.01)

(58) Field of Classification Search
  CPC ........... H01G 4/232; H01G 4/224; H01G 4/30
  See application file for complete search history.

(56) References Cited

U.S. PATENT DOCUMENTS

| 8,335,072 | B1* | 12/2012 | Kim | ......................... | H01G 4/30 |
| | | | | | 361/311 |
| 9,396,878 | B2* | 7/2016 | Oh | ......................... | H01G 4/232 |
| 10,020,117 | B2* | 7/2018 | Mizuno | ................ | H01G 4/1227 |
| 10,431,386 | B2* | 10/2019 | Kim | ...................... | H01G 4/258 |
| 10,529,490 | B1* | 1/2020 | Kwon | ...................... | H01G 4/30 |
| 10,593,479 | B2* | 3/2020 | Sasaki | .................... | H01G 4/248 |
| 10,903,007 | B2* | 1/2021 | Ono | ....................... | H01G 4/012 |
| 2005/0264975 | A1* | 12/2005 | Yamazaki | ................ | H01C 1/02 |
| | | | | | 361/301.1 |
| 2012/0073129 | A1* | 3/2012 | Abe | ....................... | H01G 4/232 |
| | | | | | 29/825 |
| 2012/0306325 | A1* | 12/2012 | Kim | ......................... | H01G 4/12 |
| | | | | | 310/366 |

(Continued)

FOREIGN PATENT DOCUMENTS

JP  2014-130999 A  7/2014

*Primary Examiner* — Dion Ferguson
(74) *Attorney, Agent, or Firm* — Chen Yoshimura LLP (57) ABSTRACT

A multi-layer ceramic electronic component includes a ceramic body enclosing internal electrodes laminated in a first direction, wherein the ceramic body has a main surface having a flat face normal to the first direction, a first side surface having a flat face normal to a second direction orthogonal to the first direction, and a rounded ridge connecting the main surface and the first side surface to each other and curved in a convex shape; a maximum dimension of the ceramic body in the first direction is 120 μm or less; and the rounded ridge satisfies a condition of Rb/Ra>3.0, where Ra represents a dimension of the rounded ridge in the first direction and Rb represents a dimension of the rounded ridge in the second direction on a cross-sectional surface of the ceramic body taken along a virtual cut plane parallel to the first direction and the second direction.

8 Claims, 9 Drawing Sheets

(56) References Cited

U.S. PATENT DOCUMENTS

| | | | | |
|---|---|---|---|---|
| 2012/0307417 | A1* | 12/2012 | Kim | H01G 4/012 |
| | | | | 361/321.2 |
| 2014/0185189 | A1* | 7/2014 | Kim | H01G 4/232 |
| | | | | 361/321.2 |
| 2014/0209364 | A1* | 7/2014 | Oh | H01G 4/30 |
| | | | | 174/260 |
| 2014/0254064 | A1* | 9/2014 | Miyazaki | H01G 4/2325 |
| | | | | 361/303 |
| 2015/0075854 | A1* | 3/2015 | You | H01G 4/30 |
| | | | | 174/260 |
| 2015/0255213 | A1* | 9/2015 | Lee | H05K 1/18 |
| | | | | 174/258 |
| 2015/0325377 | A1* | 11/2015 | Takeuchi | H01G 4/232 |
| | | | | 361/301.4 |
| 2017/0011852 | A1* | 1/2017 | Miyazaki | H01G 4/30 |
| 2017/0207025 | A1* | 7/2017 | Kim | H01G 4/30 |
| 2017/0250026 | A1* | 8/2017 | Mizuno | H01G 4/232 |
| 2019/0096583 | A1* | 3/2019 | Sasaki | H01G 4/232 |
| 2019/0237259 | A1* | 8/2019 | Onodera | H01G 4/30 |
| 2019/0304697 | A1* | 10/2019 | Nakamura | H01G 4/232 |
| 2020/0066453 | A1* | 2/2020 | Jeong | H01G 4/012 |
| 2020/0227661 | A1* | 7/2020 | Nishikiori | H01L 27/3246 |

* cited by examiner

MULTI-LAYER CERAMIC ELECTRONIC COMPONENT AND MOUNTING BOARD

BACKGROUND ART

The present disclosure relates to a low-profile multi-layer ceramic electronic component and a mounting board including the multi-layer ceramic electronic component.

Along with miniaturization of electronic devices, there are demands for reduction in height of multi-layer ceramic electronic components. Japanese Patent Application Laid-open No. 2014-130999 discloses a multi-layer ceramic capacitor including a ceramic main body with a thickness of 120 μm or less, for example.

SUMMARY OF THE INVENTION

In general, in multi-layer ceramic electronic components, ceramic bodies are chamfered by barrel polishing or the like in order to suppress chipping of the components due to collisions between the components or an external impact applied thereto. In the case of a low-profile multi-layer ceramic electronic component, a distance between the surface of the ceramic body and an internal electrode is short. Thus, it has been difficult to perform chamfering by which chipping defects of the components can be reliably prevented from occurring.

In view of the circumstances as described above, it is desirable to provide a multi-layer ceramic electronic component capable of preventing a chipping defect from occurring, and a mounting board including the multi-layer ceramic electronic component.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multi-layer ceramic electronic component, including a ceramic body enclosing internal electrodes laminated in a first direction, wherein the ceramic body has: a main surface having a flat face normal to the first direction, a first side surface having a flat face normal to a second direction that is orthogonal to the first direction, and a rounded ridge connecting the main surface and the first side surface to each other and curved in a convex shape, wherein a first dimension of the ceramic body that is defined as a maximum dimension of the ceramic body in the first direction is 120 μm or less, and wherein the rounded ridge satisfies a condition of Rb/Ra>3.0, where Ra represents a dimension of the rounded ridge in the first direction and Rb represents a dimension of the rounded ridge in the second direction on a cross-sectional surface of the ceramic body taken along a virtual cut plane that is parallel to the first direction and the second direction.

In this configuration, the ridge of the thin and low-profile multi-layer ceramic electronic component can be curved in a shape closer to an elliptical arc. Accordingly, even if the ceramic body is thin, the ridge is sufficiently rounded, and a chipping defect of the ridge due to an external impact can be prevented from occurring.

In the above-mentioned multi-layer ceramic electronic component, the ceramic body may further include a second side surface facing in a third direction orthogonal to the first direction and the second direction, and the ceramic body may have a second dimension in the second direction that is twice or more times the first dimension and is equal to or smaller than a third dimension in the third direction.

Accordingly, the multi-layer ceramic electronic component can be configured to have a thinner and flatter shape and can be reduced in size.

In the multi-layer ceramic electronic component, a ratio of the Ra to the first dimension may be 0.1 or more and 0.3 or less.

Accordingly, the size of the ridge can be moderately controlled, and a distance from the surface of the ceramic body to the internal electrode can be sufficiently ensured. Therefore, it is possible to enhance environmental resistance of the multi-layer ceramic electronic component and obtain optimal reliability.

The ridge may be curved to further satisfy a condition of Rb/Ra<5.0, and the ridge may be curved to further satisfy a condition of Rb/Ra<4.0.

Accordingly, it is possible to prevent the entire main surface from being rounded and to prevent the occurrence of such a defect that a peripheral surface rotates and faces in a vertical direction in place of the main surface at the time of mounting.

Favorably, the first dimension may be 80 μm or less, and the first dimension may be 40 μm or more and 60 μm or less.

Accordingly, the multi-layer ceramic electronic component can be configured to be further reduced in height.

Additionally, according to another embodiment of the present disclosure, there is provided a mounting board including the multi-layer ceramic electronic component described above.

As described above, according to the present disclosure, it is possible to provide a multi-layer ceramic electronic component capable of preventing a chipping defect from occurring, and a mounting board including the multi-layer ceramic electronic component.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the invention as claimed.

DETAILED DESCRIPTION OF EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. OVERALL CONFIGURATION OF MULTI-LAYER CERAMIC CAPACITOR 10

Figure 1:
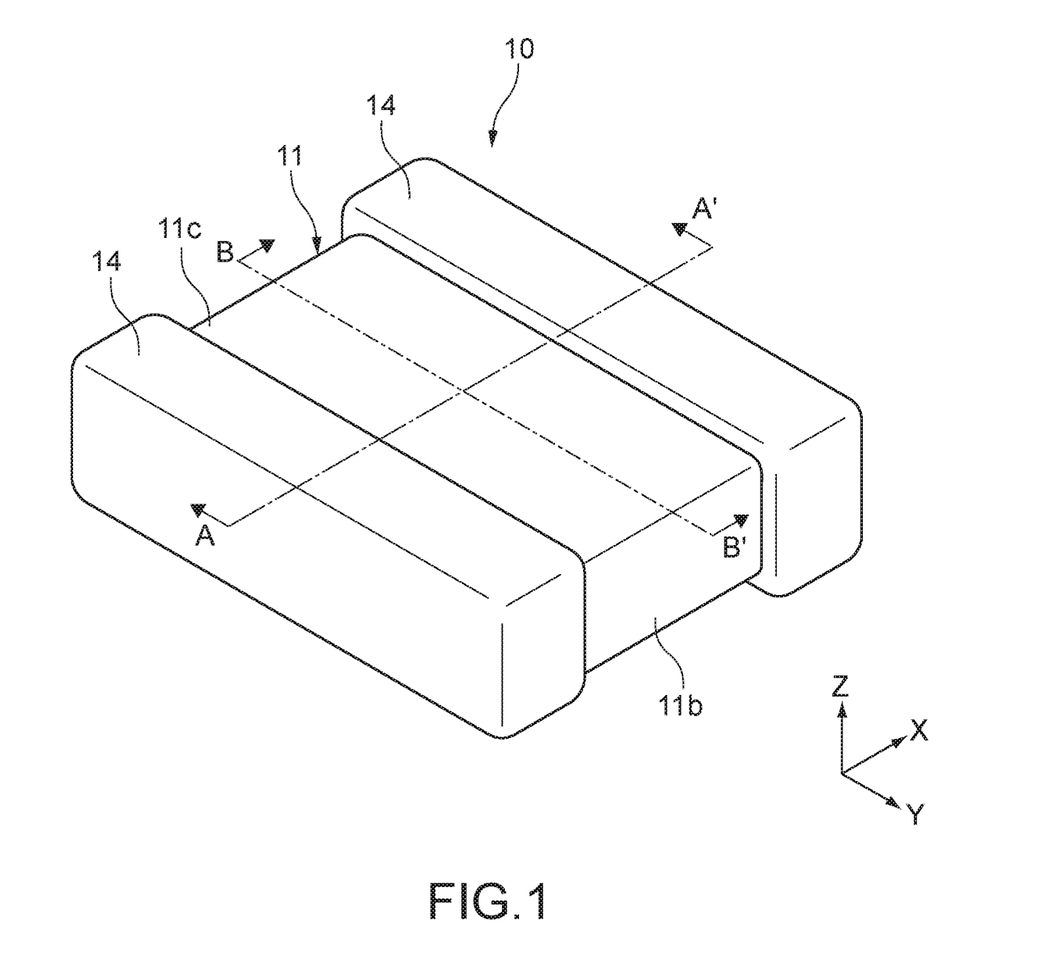
FIG. 1 is a perspective view of a multi-layer ceramic capacitor according to an embodiment of the present disclosure.
Figure 2:
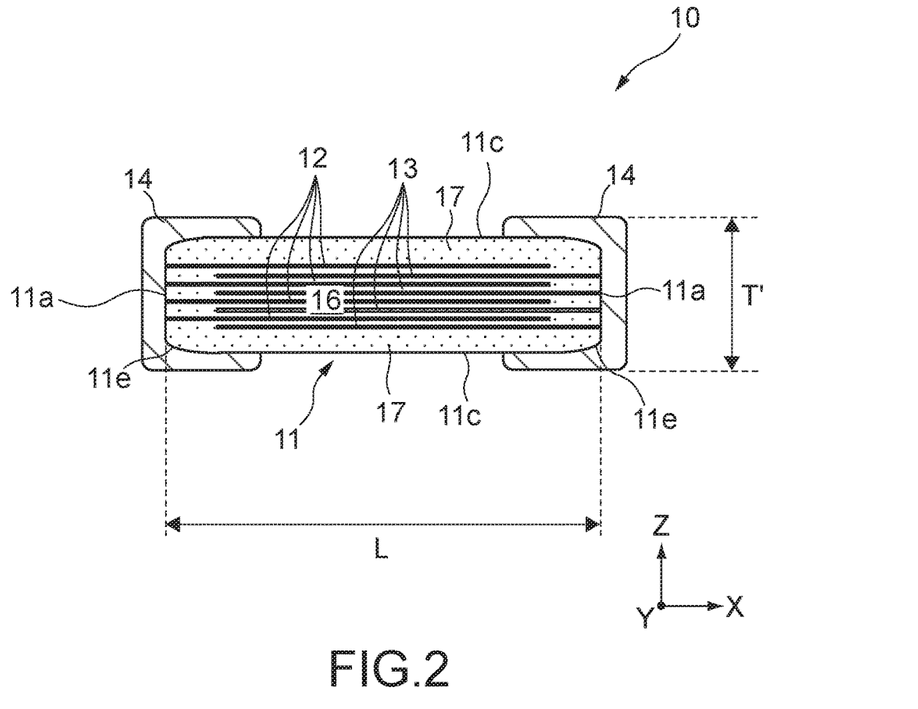
FIG. 2 is a cross-sectional view of the multi-layer ceramic capacitor taken along the A-A' line in FIG. 1.
Figure 3:
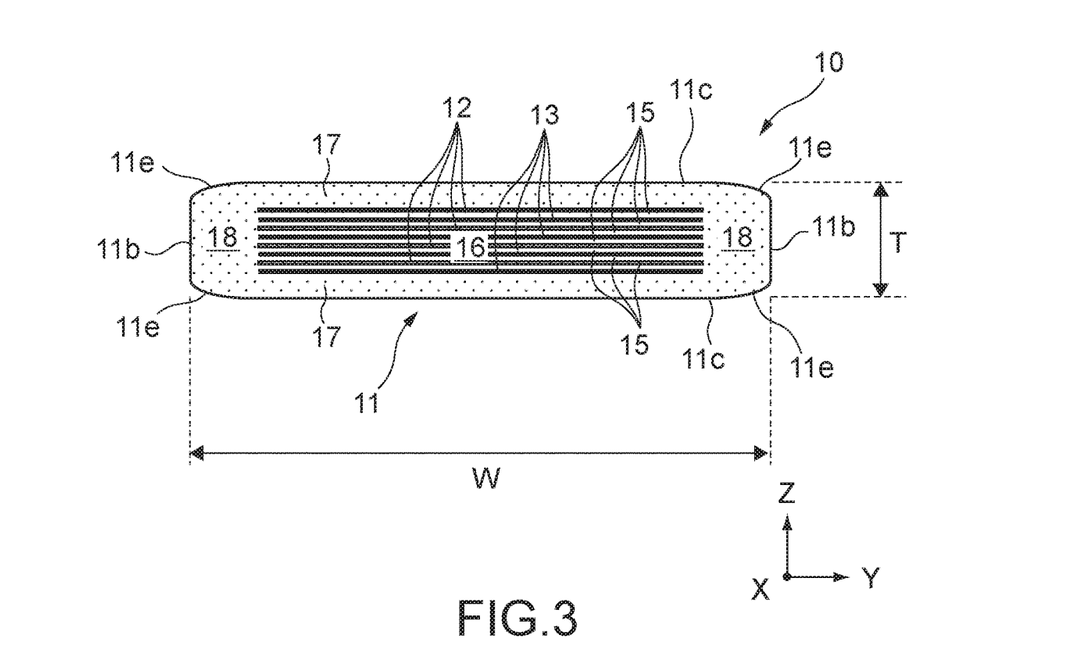
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11 and two external electrodes 14. Each of the external electrodes 14 is formed on the surface of the ceramic body 11.

The ceramic body 11 has two first side surfaces 11b facing in the Y-axis direction, two second side surfaces 11a facing in the X-axis direction, two main surfaces 11c facing in the Z-axis direction, and ridges 11e connecting the main surfaces 11c and the first side surfaces 11b to each other. The side surfaces 11a and 11b and the main surfaces 11c are formed of, for example, uniform surfaces free from steps or the like.

The ridge 11e is formed of a curved surface that is curved in a convex shape. The detailed configuration of the ridge 11e will be described later.

A dimension T' of the multi-layer ceramic capacitor 10 in the Z-axis direction, which includes the external electrode 14, is 150 μm or less, for example. The multi-layer ceramic capacitor 10 is configured to be low in height. A height dimension T of the ceramic body 11 in the Z-axis direction is 120 μm or less, favorably 80 μm or less, and may be 40 μm or more and 60 μm or less, for example. Accordingly, the multi-layer ceramic capacitor 10 can be reduced in size.

A dimension L of the ceramic body 11 in the X-axis direction is, for example, 0.2 mm to 2.0 mm. A dimension W of the ceramic body 11 in the Y-axis direction is, for example, 0.2 mm to 2.0 mm. It should be noted that each dimension of the multi-layer ceramic capacitor 10 is assumed as a dimension of a largest portion along each direction. In this embodiment, the ceramic body 11 has the dimension W equal to or larger than the dimension L and has a long side in the Y-axis direction, for example.

In this embodiment, the dimension L of the ceramic body 11 in the X-axis direction is twice or more times the dimension T of the ceramic body 11 in the Z-axis direction and is equal to or smaller than the dimension W in the Y-axis direction. In other words, the smaller one of the dimension L and the dimension W can be set to be twice or more times the dimension T. Accordingly, the multi-layer ceramic capacitor 10 can be formed into a flat shape and further reduced in size.

The ceramic body 11 includes a capacitance forming unit 16, covers 17, and side margins 18. The capacitance forming unit 16 is disposed at the center portion of the ceramic body 11 in the Y- and Z-axis directions. The covers 17 cover the capacitance forming unit 16 from the Z-axis direction, and the side margins 18 cover the capacitance forming unit 16 from the Y-axis direction.

More specifically, the covers 17 are disposed on both sides of the capacitance forming unit 16 in the Z-axis direction. The side margins 18 are disposed on both sides of the capacitance forming unit 16 in the Y-axis direction. The covers 17 and the side margins 18 have main functions of protecting the capacitance forming unit 16 and ensuring insulation properties of the periphery of the capacitance forming unit 16.

The capacitance forming unit 16 has a configuration including a plurality of first internal electrodes 12 and a plurality of second internal electrodes 13, which are laminated in the Z-axis direction via ceramic layers 15 (see FIG. 3). The first internal electrodes 12 and the second internal electrodes 13 each have a sheet-like shape extending along the X-Y plane and are alternately disposed along the Z-axis direction.

The first internal electrodes 12 and the second internal electrodes 13 are each formed of a good conductor of electricity and function as internal electrodes of the multi-layer ceramic capacitor 10. Examples of the good conductor of electricity forming the first and second internal electrodes 12 and 13 include a metal mainly containing nickel (Ni), copper (Cu), palladium (Pd), platinum (Pt), silver (Ag), gold (Au), or the like, and an alloy of those metals.

As shown in FIG. 2, the first and second internal electrodes 12 and 13 are connected to the external electrodes 14 formed on the two second side surfaces 11a. The first internal electrodes 12 are drawn to, for example, one of the second side surfaces 11a of the ceramic body 11 and connected to one of the external electrodes 14. The second internal electrodes 13 are drawn to the other second side surface 11a of the ceramic body 11 and connected to the other external electrode 14.

The ceramic layers 15 are formed of dielectric ceramics. In the multi-layer ceramic capacitor 10, in order to increase a capacitance of each ceramic layer 15 provided between the first internal electrode 12 and the second internal electrode 13, dielectric ceramics having a high dielectric constant is used. Examples of the dielectric ceramics having a high dielectric constant include a material having a Perovskite structure containing barium (Ba) and titanium (Ti), which is typified by barium titanate ($BaTiO_3$).

Further, the dielectric ceramics may be a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, and a titanium oxide ($TiO_2$) based material, other than a barium titanate based material.

The covers 17 and the side margins 18 are also formed of dielectric ceramics. The material forming the covers 17 and the side margins 18 only needs to be insulating ceramics, but if a material having a composition system similar to that of the capacitance forming unit 16 is used therefor, production efficiency is increased, and internal stress in the ceramic body 11 is suppressed.

With the configuration described above, when a voltage is applied between the external electrodes 14 in the multi-layer ceramic capacitor 10, the voltage is applied to the plurality of ceramic layers 15 provided between the first internal electrodes 12 and the second internal electrodes 13 in the capacitance forming unit 16. With this configuration, the multi-layer ceramic capacitor 10 stores charge corresponding to the voltage applied between the external electrodes 14.

2. CONFIGURATION OF RIDGE 11E

Figure 4:
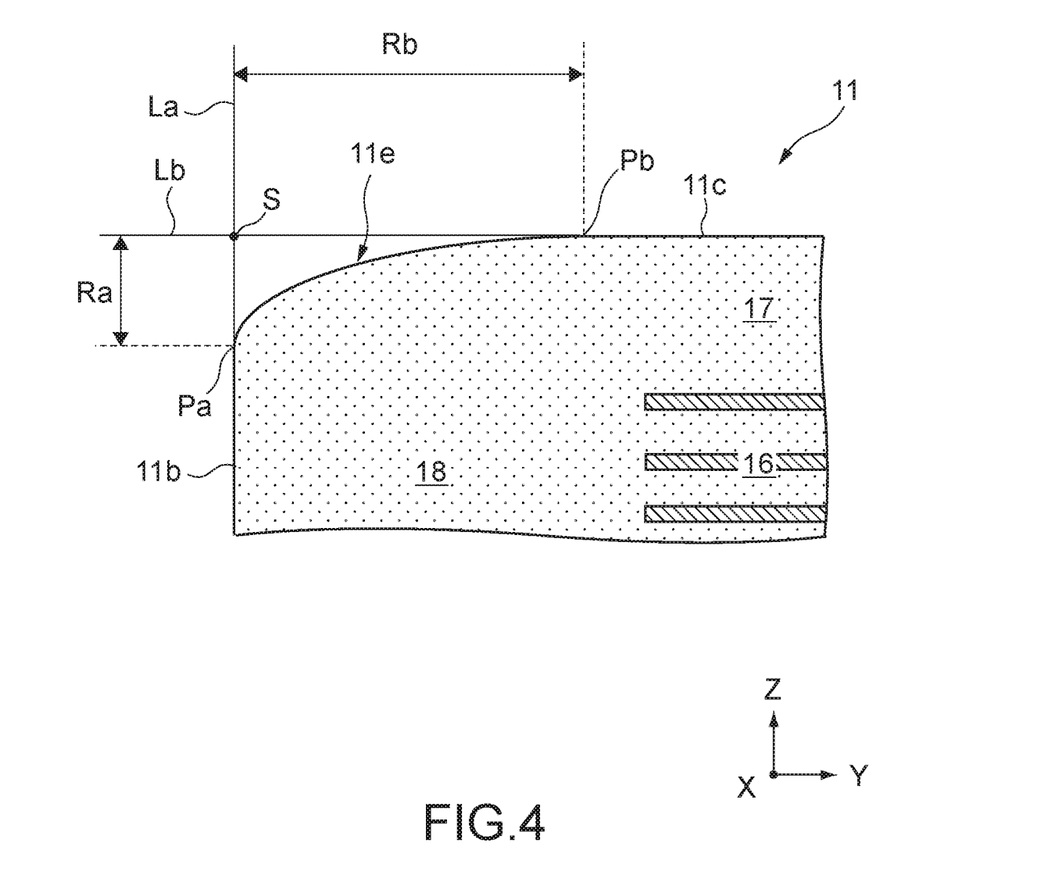
FIG. 4 is an enlarged view of FIG. 3.

FIG. 4 is an enlarged view of FIG. 3 and shows a configuration of the ridge 11e. The ridge 11e is formed between the first side surface 11b and the main surface 11c.

In the ridge 11e, a dimension Ra in the Z-axis direction and a dimension Rb in the Y-axis direction satisfy a condition of Rb/Ra>3.0 on a cross-sectional surface of the ceramic body 11 taken along a virtual cut plane that is parallel to the Z-axis direction and the Y-axis direction.

The dimension Ra of the ridge 11e in the Z-axis direction and the dimension Rb of the ridge 11e in the Y-axis direction are expressed as follows by using a first tangent line La tangent to the first side surface 11b and extending in the Z-axis direction and a second tangent line Lb tangent to the main surface 11c and extending in the Y-axis direction.

The dimension Ra is a distance between a first end portion Pa of the ridge 11e, which is a tangent point to the first tangent line La, and an intersection point S of the first tangent line La and the second tangent line Lb.

The dimension Rb is a distance between a second end portion Pb of the ridge 11e, which is a tangent point to the second tangent line Lb, and the intersection point S.

Although the first side surface 11b and the main surface 11c, etc., other than the ridges 11e are shown as being perfectly flat in the drawings, these flat surfaces may have a small surface roughness or a minute curvature as tolerated in usual manufacturing processes of this type of products.

The dimension Ra and the dimension Rb of the ridge 11e may be measured on a cross-sectional surface obtained by cutting the ceramic body 11 in a plane parallel to the Z-axis direction and the Y-axis direction, which is orthogonal to the X-axis direction. As an example, the dimension Ra and the dimension Rb of the ridge 11e are measured on a cross-sectional surface obtained by cutting the ceramic body 11 in the Z-axis direction at a position at which the first side surface 11b is divided into two halves in the X-axis direction.

The ridge 11e is curved in the shape as described above and thus curved in a shape closer to an elliptical arc having a major axis in the Y-axis direction. In other words, even if the ceramic body 11 has a flat shape, the ridge 11e is curved in a flat shape accordingly. Therefore, the ridge 11e sufficiently rounded can be formed, and a chipping defect of the ceramic body 11 due to impacts between components or an external impact can be prevented from occurring.

Additionally, it is favorable that Rb/Ra<5.0. Accordingly, the entire main surface 11c is prevented from being rounded, and the posture of the multi-layer ceramic capacitor 10 can be stabilized. Therefore, for example, in a case where the main surface 11c is intended to be mounted parallel to a mount surface of a wiring board at the timing of mounting, it is possible to prevent the occurrence of a mounting defect in which the multi-layer ceramic capacitor 10 loses its balance and rises in a manner that the main surface 11c is orthogonal to the mount surface. Further, it is possible to stack a plurality of multi-layer ceramic capacitors 10 in the Z-axis direction and facilitate handling thereof during transportation or storage. From such a viewpoint, it is more favorable that Rb/Ra<4.0.

Further, a ratio of the dimension Ra to the body height dimension T is favorably 0.1 or more and 0.3 or less. Accordingly, the size of the rounded ridge 11e can be moderately controlled, and a distance from the surface of the body 11 to the first and second internal electrodes 12 and 13 can be sufficiently ensured. Therefore, it is possible to enhance environmental resistance such as moisture resistance of the multi-layer ceramic capacitor 10 and obtain optimal reliability.

3. METHOD OF PRODUCING MULTI-LAYER CERAMIC CAPACITOR 10

Figure 5:
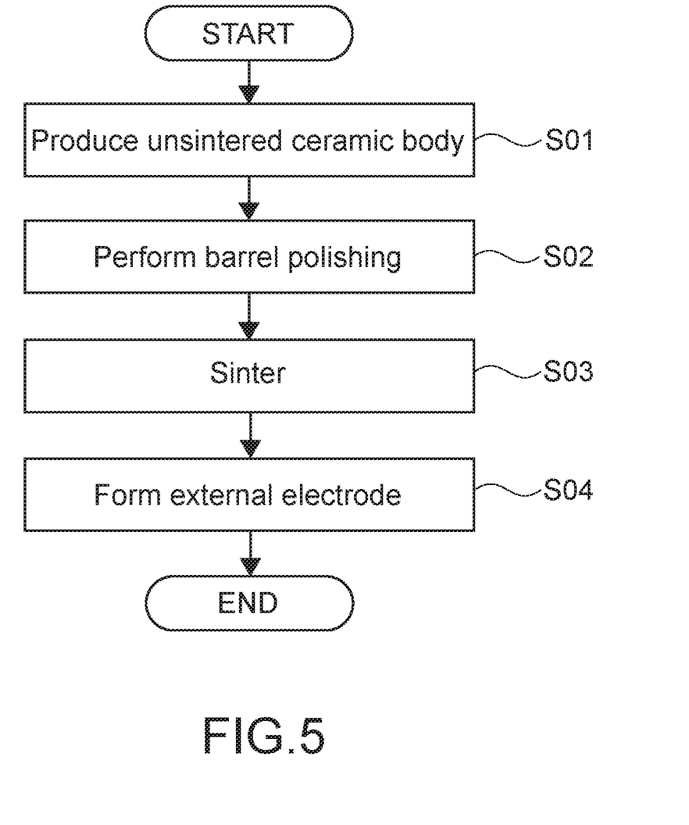
FIG. 5 is a flowchart showing a method of producing the multi-layer ceramic capacitor.

FIG. 5 is a flowchart showing a method of producing the multi-layer ceramic capacitor 10. FIGS. 6 to 9 are views each showing a production process of the multi-layer ceramic capacitor 10. Hereinafter, the method of producing the multi-layer ceramic capacitor 10 will be described along FIG. 5 with reference to FIGS. 6 to 9 as appropriate.

3.1 Step S01: Production of Unsintered Ceramic Body

Figure 6:
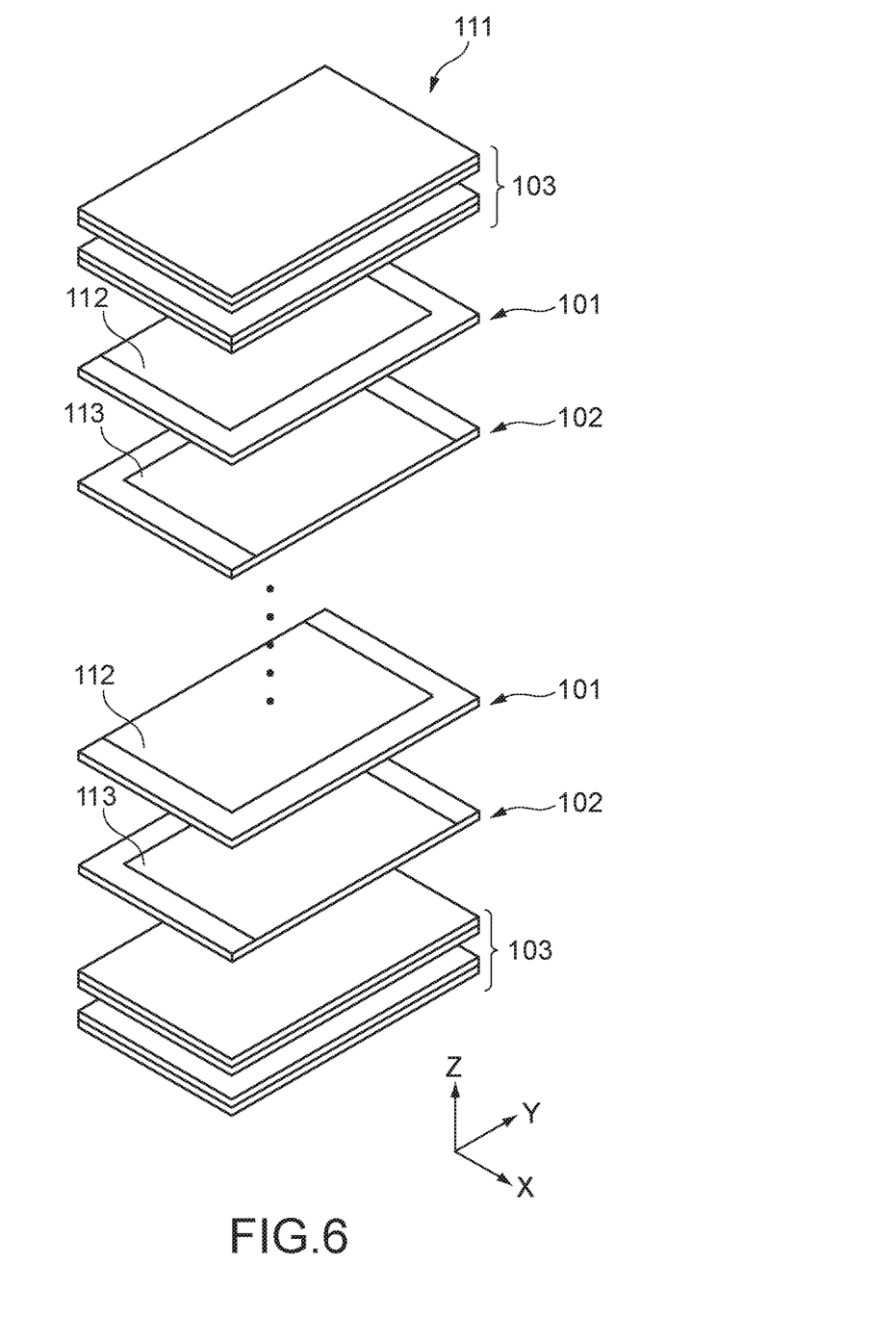
FIG. 6 is a perspective view showing a production process of the multi-layer ceramic capacitor.

In Step S01, first ceramic sheets 101 and second ceramic sheets 102 for forming the capacitance forming unit 16, and third ceramic sheets 103 for forming the covers 17 are prepared. As shown in FIG. 6, the first, second, and third ceramic sheets 101, 102, and 103 are laminated to produce an unsintered ceramic body 111.

The first, second, and third ceramic sheets 101, 102, and 103 are configured as unsintered dielectric green sheets mainly containing dielectric ceramics and including an organic binder or the like. Unsintered first internal electrodes 112 corresponding to the first internal electrodes 12 are formed on the first ceramic sheets 101, and unsintered second internal electrodes 113 corresponding to the second internal electrodes 13 are formed on the second ceramic sheets 102. The first internal electrodes 112 and the second internal electrodes 113 are formed by printing, for example.

In the first and second ceramic sheets 101 and 102, regions corresponding to the side margins 18 and including no first and second internal electrodes 112 and 113 are provided at circumferential edges of the first and second internal electrodes 112 and 113 in the Y-axis direction. Internal electrodes are not formed on the third ceramic sheets 103.

As shown in FIG. 6, in the unsintered ceramic body 111, the first and second ceramic sheets 101 and 102 are alternately laminated, and the third ceramic sheets 103 corresponding to the covers 17 are laminated on the upper and lower surfaces of the laminated first and second ceramic sheets 101 and 102 in the Z-axis direction. The unsintered ceramic body 111 is integrated by pressure-bonding the first, second, and third ceramic sheets 101, 102, and 103. It should be noted that the number of first, second, and third ceramic sheets 101, 102, and 103 is not limited to the example shown in FIG. 6.

The first and second ceramic sheets 101 and 102 on which the first and second internal electrodes 112 and 113 are respectively formed may have a different material composition from that of the third ceramic sheets 103 corresponding to the covers 17. Specifically, the third ceramic sheets 103 may be formed at lower density than that of the first and second ceramic sheets 101 and 102. This makes it easier to polish regions corresponding to the covers 17 in a barrel polishing process to be described later, and easy to form the ridges 11e having the configuration described above.

Figure 7:
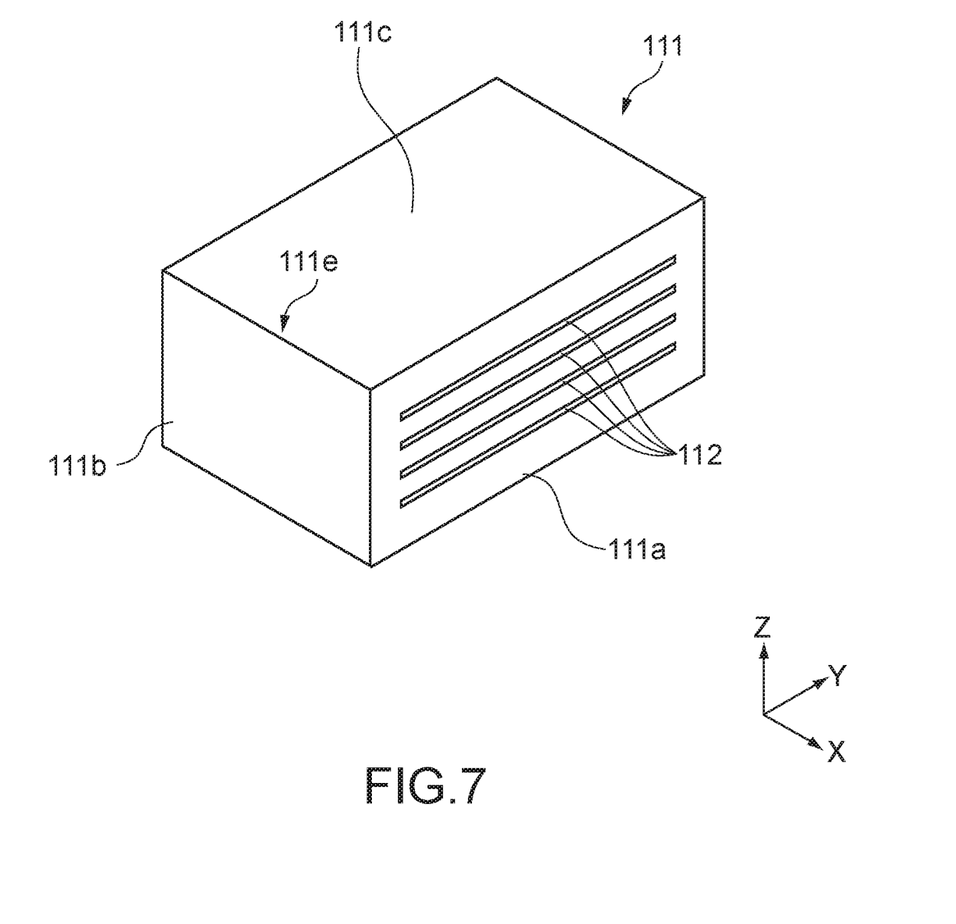
FIG. 7 is a perspective view showing a production process of the multi-layer ceramic capacitor.

Through this step, the unsintered ceramic body 111 including main surfaces 111c, first side surfaces 111b, second side surfaces 111a, and ridges 111e as shown in FIG. 7 is produced. In this stage, the ridges 111e of the ceramic body 111 are angular.

It should be noted that while the unsintered ceramic body 111 corresponding to the single ceramic body 11 has been described above, in actually, a multi-layer sheet configured as a large-sized sheet, which is not singulated, is formed and then singulated into the ceramic bodies 111.

3.2 Step S02: Barrel Polishing

In Step S02, barrel polishing is performed on the unsintered ceramic body 111.

Figure 8A:
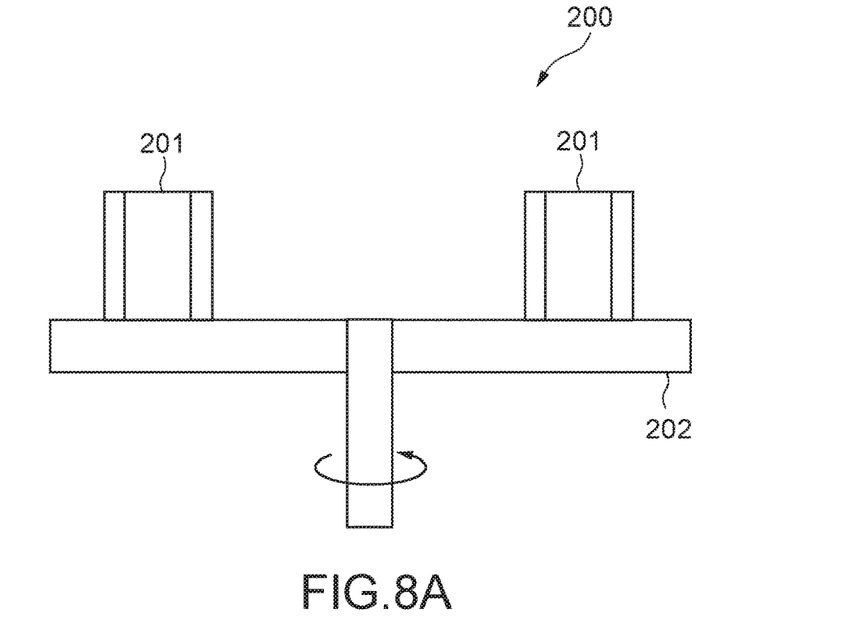
FIGS. 8A and 8B are respectively a side view and a plan view of a production device for the multi-layer ceramic capacitor.
Figure 8B:
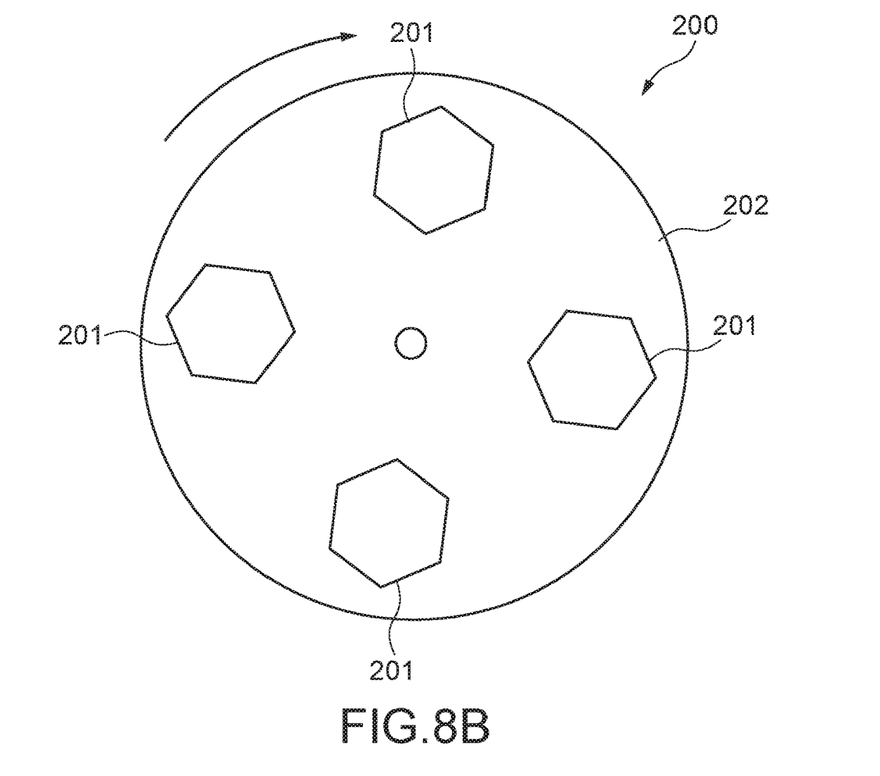

FIGS. 8A and 8B are views each showing a configuration example of a barrel device 200 used in this step. FIG. 8A is a side view and FIG. 8B is a plan view. The barrel device 200 includes, for example, a rotatable circular plate 202 connected to a drive unit (not shown), and a plurality of barrel containers 201 eccentrically disposed on the circular plate 202. The barrel containers 201 are each formed into, for example, a prismatic shape or a columnar shape. The barrel container 201 may include a rotation shaft (not shown) and be configured to be rotatable about the shaft.

In this step, the unsintered ceramic bodies 111, a polishing solution, and the like are loaded in the barrel containers 201. The circular plate 202 rotates, and thus a centrifugal force acts on the barrel containers 201. Accordingly, the ceramic bodies 111 collide with the inner walls or the like of the barrel containers 201, the ridges 111e liable to collide are filed, and thus ridges 111e curved in convex shapes are formed. Time for barrel polishing can be set to, for example, approximately 1 to 60 minutes.

While the polishing solution is not particularly limited, for example, water hardly soluble in the organic binder or the like contained in the first, second, and third ceramic sheets 101, 102, and 103 can be used.

In addition to the unsintered ceramic bodies 111 and the polishing solution, a medium may be additionally loaded in the barrel containers 201. The medium is loaded, and thus the ceramic bodies 111 flow while coming into contact also with the medium. This allows polishing to be performed more effectively.

The medium includes, for example, a metal oxide such as alumina or zirconium dioxide. The medium is formed of spherical particles, for example. In a case where the medium is formed of spherical particles, the diameter thereof can be set to, for example, approximately 0.1 to 0.3 times the body height dimension T. This makes it easier to form the ridge 11e having a curved surface.

Figure 9:
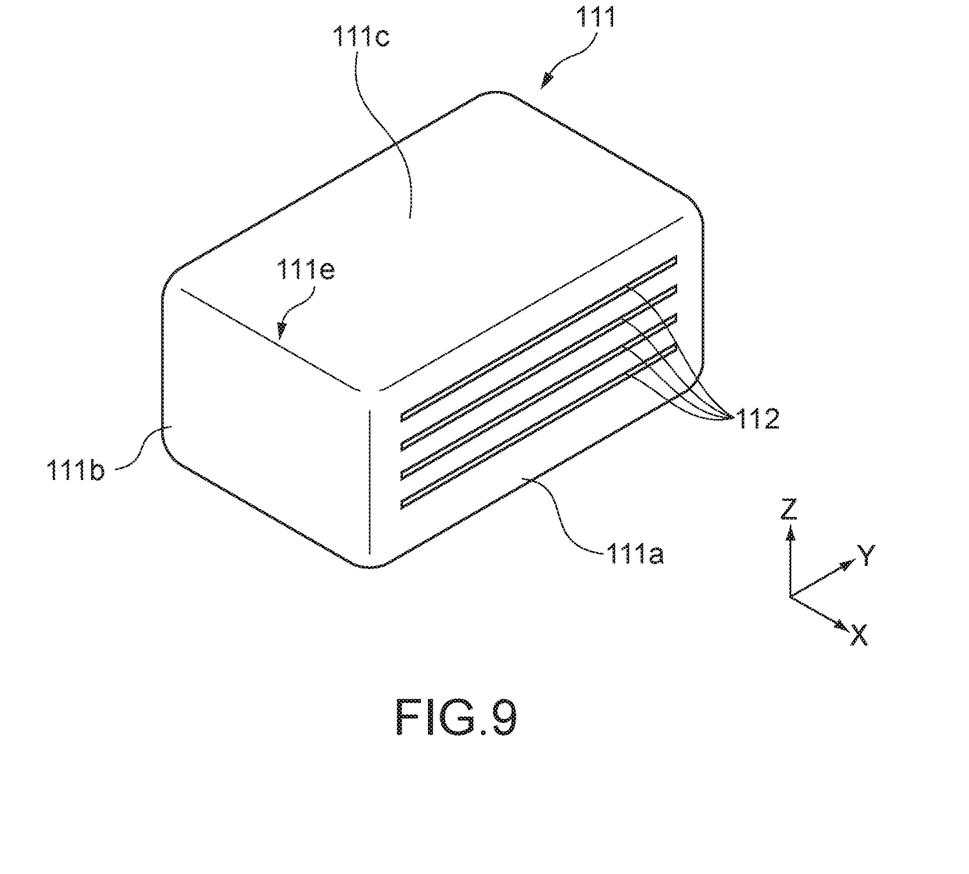
FIG. 9 is a perspective view showing a production process of the multi-layer ceramic capacitor.

Through this step, as shown in FIG. 9, the ceramic body 111 including the ridges 111e, each of which is rounded and has a surface curved in a convex shape, is produced. It should be noted that such a curved surface may also be formed between the second side surfaces 111a and the main surfaces 111c, in addition to between the first side surfaces 111b and the main surfaces 111c.

3.3 Step S03: Sintering

In Step S03, the unsintered ceramic body 111 obtained in Step S02 is sintered, to produce the ceramic body 11 of the multi-layer ceramic capacitor 10 shown in FIGS. 1 to 4. Sintering can be performed in a reduction atmosphere or a low-oxygen partial pressure atmosphere, for example.

3.4 Step S04: Formation of External Electrode

In Step S04, the external electrodes 14 are formed on the ceramic body 11 obtained in Step S03.

In Step S04, for example, an electrically conductive thin film is formed as a base film so as to cover the second side surfaces 11a of the ceramic body 11. The electrically conductive thin film may be a film obtained by baking an applied electrically conductive paste or may be formed by a thin film forming method such as sputtering. Alternatively, the electrically conductive thin film may include both of a film obtained by baking an electrically conductive paste and a thin film formed by sputtering or the like. With the electrically conductive thin film being used as a base film, plating such as electrolytic plating is performed. Accordingly, the external electrodes 14 are formed.

As described above, the multi-layer ceramic capacitor 10 shown in FIGS. 1 to 4 is produced.

Figure 10:
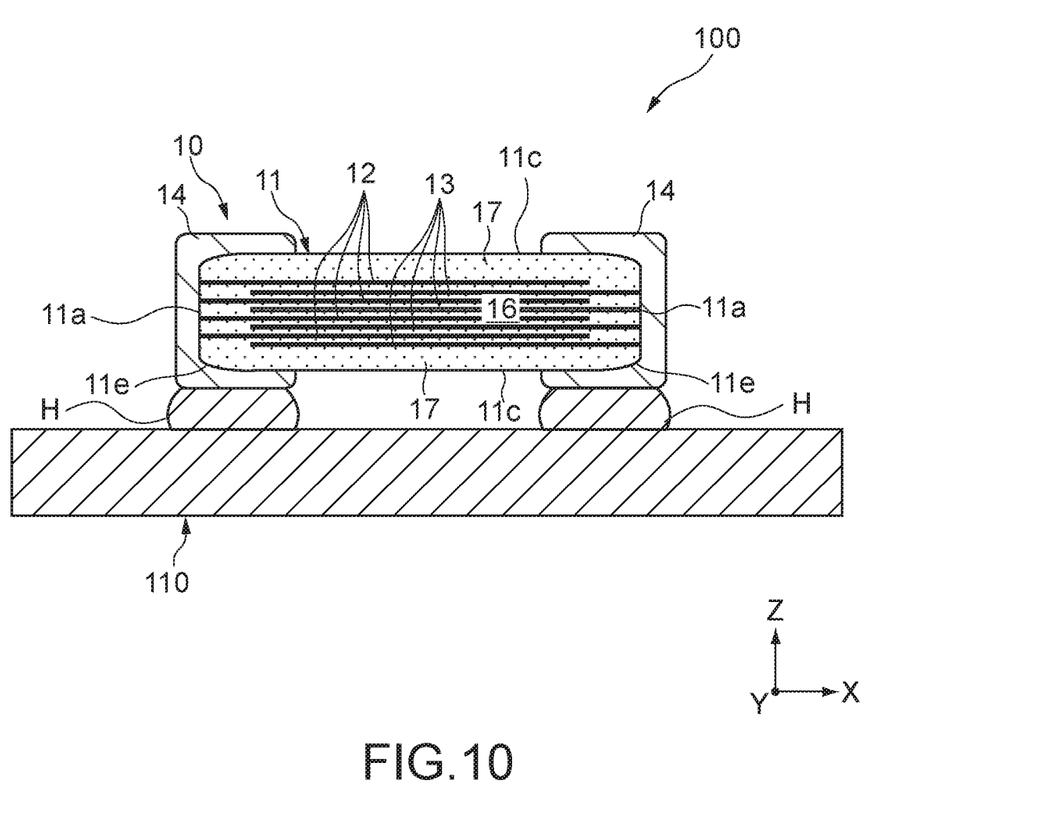
FIG. 10 is a cross-sectional view of a mounting board including the multi-layer ceramic capacitor.

Additionally, as shown in FIG. 10, the external electrodes 14 of such a multi-layer ceramic capacitor 10 may be bonded to a circuit board 110 by solder H. Accordingly, a mounting board 100 including the multi-layer ceramic capacitor 10 is produced.

4. EXAMPLES AND COMPARATIVE EXAMPLES

As Examples and Comparative examples of this embodiment, samples of a multi-layer ceramic capacitor with a changed body height dimension and a changed shape of the curved surface of the ridge were produced by the production method described above. The dimension L of each sample in the X-axis direction was set to 1.0 mm, and the dimension W of each sample in the Y-axis direction was set to 0.5 mm. Table 1 shows the body height dimensions T of those samples. Further, the first side surface of each sample was cut along the B-B' line in FIG. 1 (at a position at which the first side surface is divided into approximately two halves in the X-axis direction). On the cross-sectional surface thus obtained, the values of Ra and Rb were measured. Table 1 shows the measured values of Ra and Rb.

TABLE 1

|  | Body height dimension T (μm) | Ra | Rb | Rb/Ra | Ra/Body height dimension T | Defect rate of chipped appearance | Defect rate of moisture resistance |
| --- | --- | --- | --- | --- | --- | --- | --- |
| Example 1 | 55 | 12.8 | 46.6 | 3.65 | 0.23 | 0% | 0% |
| Example 2 | 70 | 19.0 | 63.2 | 3.32 | 0.27 | 0% | 0% |
| Example 3 | 70 | 22.4 | 76.5 | 3.41 | 0.32 | 0% | 5% |
| Example 4 | 70 | 28.0 | 100.0 | 3.57 | 0.40 | 0% | 20% |
| Comparative example 1 | 40 | 6.0 | 13.0 | 2.17 | 0.15 | 80% | 0% |
| Comparative example 2 | 40 | 6.8 | 15.8 | 2.32 | 0.17 | 50% | 0% |
| Comparative example 3 | 40 | 7.4 | 20.1 | 2.72 | 0.19 | 10% | 0% |
| Comparative example 4 | 70 | 12.0 | 30.0 | 2.50 | 0.17 | 15% | 0% |
| Comparative example 5 | 80 | 9.4 | 18.0 | 1.91 | 0.12 | 30% | 0% |

Subsequently, Rb/Ra was calculated from the measured values of Ra and Rb. As shown in Table 1, the samples of Examples 1 to 4 had Rb/Ra of 3.65, 3.32, 3.41, and 3.57, respectively, all of which were 3.0 or more. Meanwhile, the samples of Comparative examples 1 to 5 had Rb/Ra of 2.17, 2.32, 2.72, 2.50, and 1.91, respectively, all of which were less than 3.0. It should be noted that those measured values and the following results were mean values of 50 samples in each of Examples and Comparative examples.

Further, a value of a ratio of Ra to the body height dimension T was calculated from the measured value of Ra and the body height dimension T. As shown in Table 1, the samples of Examples 1 and 2 and Comparative examples 1 to 5 had the value of the ratio of 0.1 or more and 0.3 or less, whereas the samples of Examples 3 and 4 had the value of the ratio of 0.32 and 0.40, respectively, which were larger than 0.3.

Those samples were subjected to visual inspection to evaluate the presence/absence of a chipping defect in the ceramic bodies. Table 1 shows the results.

In each of Examples 1 to 4 having Rb/Ra of 3.0 or more, a rate of the chipping defect, in which part of the product was chipped, was 0%. Meanwhile, in Comparative examples 1 to 5 having Rb/Ra less than 3.0, the chipping defect rate was 80%, 50%, 10%, 15%, and 30%, respectively, and the samples having the chipping defect were found.

From those results, it was confirmed that setting Rb/Ra to be 3.0 or more can prevent the chipping defect from occurring.

Subsequently, a moisture resistance test was performed as a reliability test to detect the presence/absence of a short circuit under a severe environment (temperature of 85° C., humidity of 85%, and applied voltage of 10 V).

As a result, in the samples of Examples 1 and 2 and Comparative examples 1 to 5, in which the ratio of Ra to the body height dimension T was 0.1 or more and 0.3 or less, the occurrence rate of a short circuit was 0%. Meanwhile, in the samples of Examples 3 and 4, in which the ratio was larger than 0.3, the occurrence rate of a short circuit was 5% and 20%, respectively, and the samples having a short circuit caused under the severe environment were found. From those results, it was confirmed that setting the ratio of Ra to the body height dimension T to 0.1 or more and 0.3 or less can provide a product having high environmental resistance and high reliability.

5. OTHER EMBODIMENTS

While the embodiment of the present disclosure has been described, the present disclosure is not limited to the embodiment described above, and it should be appreciated that the present disclosure may be variously modified without departing from the gist of the present disclosure.

The ridge 11e curved in a convex shape may be formed between the second side surface 11a and the main surface 11c, in addition to between the first side surface 11b and the main surface 11c.

The embodiment above has described that the Y-axis direction is the longitudinal direction along which a longer side of the ceramic body 11 lies, but the present disclosure is not limited thereto. The dimension L may be larger than the dimension W, and the X-axis direction may be the longitudinal direction along which a longer side of the ceramic body 11 lies.

Further, the direction in which the first and second internal electrodes 12 and 13 are drawn is also not limited to the X-axis direction.

The barrel polishing in Step S02 is not limited to the mode performed on the unsintered ceramic body 111, and may be performed on, for example, the ceramic body 11 obtained after sintering. Alternatively, after a first barrel polishing process is performed on the unsintered ceramic body 111, a second barrel polishing process may be performed on the ceramic body 11 obtained after sintering.

Further, part of the processing in Step S04 may be performed before Step S03. For example, before Step S03, an electrically conductive paste may be applied to both end surfaces of the unsintered ceramic body 111 in the X-axis direction and, in Step S03, at the same time as sintering of the unsintered ceramic body 111, the electrically conductive paste may be baked to form base layers of the external electrodes 14. Further, an unsintered electrode material may be applied to the debindered ceramic body 111, and the unsintered electrode material and the debindered ceramic body 111 may be simultaneously sintered.

In the embodiment described above, the multi-layer ceramic capacitor 10 has been described as an example of a multi-layer ceramic electronic component, but the present disclosure can be applied to any other multi-layer ceramic electronic components each including laminated ceramic layers and internal electrodes. Examples of such multi-layer ceramic electronic components include a chip varistor, a chip thermistor, and a multi-layer inductor.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multi-layer ceramic electronic component, comprising a ceramic body enclosing internal electrodes laminated in a first direction,
    wherein the ceramic body has:
        a main surface having a flat face normal to the first direction,
        a first side surface having a flat face normal to a second direction that is orthogonal to the first direction, and
        a rounded ridge connecting the main surface and the first side surface to each other and curved in a convex shape,
    wherein a first dimension of the ceramic body that is defined as a maximum dimension of the ceramic body in the first direction is 120 μm or less, and
    wherein the rounded ridge satisfies a condition of Rb/Ra>3.0, where Ra represents a dimension of the rounded ridge in the first direction and Rb represents a dimension of the rounded ridge in the second direction on a cross-sectional surface of the ceramic body taken along a virtual cut plane that is parallel to the first direction and the second direction.

2. The multi-layer ceramic electronic component according to claim 1,
    wherein the ceramic body further includes a second side surface having a flat face normal to a third direction that is orthogonal to the first direction and the second direction, and
    wherein a second dimension of the ceramic body that is defined as a maximum dimension of the ceramic body in the second direction is twice or more times the first dimension and is equal to or smaller than a third dimension of the ceramic body that is defined as a maximum dimension of the ceramic body in the third direction.

3. The multi-layer ceramic electronic component according to claim 1, wherein a ratio of the Ra to the first dimension is 0.1 or more and 0.3 or less.

4. The multi-layer ceramic electronic component according to claim 1, wherein the rounded ridge further satisfies a condition of Rb/Ra<5.0.

5. The multi-layer ceramic electronic component according to claim 4, wherein the rounded ridge further satisfies a condition of Rb/Ra<4.0.

6. The multi-layer ceramic electronic component according to claim 1, wherein the first dimension is 80 µm or less.

7. The multi-layer ceramic electronic component according to claim 6, wherein the first dimension is 40 µm or more and 60 µm or less.

8. A mounting board, comprising:
a circuit board; and
the multi-layer ceramic electronic component according to claim 1 mounted on the circuit board.

* * * * *